United States Patent [19]

Czonka

[11] Patent Number: 5,124,860
[45] Date of Patent: Jun. 23, 1992

[54] TAPE RECORDING APPARATUS WHICH PREVENTS PRESSURE ROLLER DEFORMATION DUE TO EXTENDED INTERRUPTIONS OF RECORDING

[75] Inventor: Viktor Czonka, Langenzersdorf, Austria

[73] Assignee: U.S. Philips Corporation, New York, N.Y.

[21] Appl. No.: 518,890

[22] Filed: May 4, 1990

[30] Foreign Application Priority Data

May 5, 1989 [AT] Austria ................... 1074/89

[51] Int. Cl.$^5$ ............................................. G11B 15/18
[52] U.S. Cl. ........................................ 360/71; 360/74.1
[58] Field of Search ............... 360/71, 74.4, 69, 72.1

[56] References Cited

U.S. PATENT DOCUMENTS 4,366,514 12/1982 Sato et al. ...................... 360/74.4
4,701,813 10/1987 Miyake et al. ..................... 360/71

Primary Examiner—John H. Wolff
Attorney, Agent, or Firm—Leroy Eason

[57] ABSTRACT

An apparatus for recording information signals on a record carrier in the form of a tape can be set to an "information-signal-controlled recording" mode. The record carrier is driven by a motor drive arrangement (12) which includes two non-positively cooperating drive elements (15, 16) which are pressed constantly against one another during such recording mode, the motor being started by a motor control circuit (43) upon occurrence of an information signal which is detected by an information signal detector 40. The motor control circuit switches the motor off with a delay following termination of the information signal, and includes a pulse generation device (G) which, if during the recording mode the information signal fails to appear for longer than a time interval ($T_2$) generates short control signal pulses ($M_1$) which recur at such time intervals ($T_2$) and which briefly start the motor, thereby causing the two drive elements (15, 16) to be brought into different positions relative to each other during each of such intervals.

4 Claims, 2 Drawing Sheets

TAPE RECORDING APPARATUS WHICH PREVENTS PRESSURE ROLLER DEFORMATION DUE TO EXTENDED INTERRUPTIONS OF RECORDING

BACKGROUND OF THE INVENTION

1. Field of the Invention

The invention relates to an apparatus for recording information signals on a record carrier, which apparatus can be set to an "information-signal-controlled recording" mode and, for driving the record carrier, comprises a motor and a drive arrangement adapted to be driven by the motor. The drive arrangement comprises at least two drive elements, which drive elements are constantly pressed against each other in the "information-signal-controlled recording" mode. The apparatus further comprises an information signal detector which during the appearance of an information signal supplies a detection signal to a motor control circuit which generates a control signal for switching on the motor. When the apparatus is in the "information-signal-controlled recording" mode such control signal immediately switches on the motor upon the appearance of the detection signal, keeps the motor switched on if the detection signal fails to appear during a given time interval of the order of magnitude of normal breaks in the information signals, and does not switch off the motor until the given time interval has elapsed.

2. Description of the Related Art

In commercially available magnetic tape recording apparatus, which is intended in particular for recording speech signals, the drive arrangement for the magnetic tape comprises a rotatable steel drive shaft and a pressure roller having a circumferential rubber coating which is spring-loaded towards a capstan to press the magnetic tape against said shaft during the recording of speech signals in a "speech-signal-controlled recording" mode. In such mode the pressure roller remains constantly pressed against the drive shaft, even if the user of the apparatus has interrupted the dictation process for a long time or has forgotten to turn off the recording mode after completing dictation. In such a case the capstan is pressed into the rubber coating of the pressure roller, which leads to a permanent deformation of the pressure roller which during subsequent use of the apparatus adversely affects uniform and correct drive of the magnetic tape.

SUMMARY OF THE INVENTION

It is an object of the invention to avoid the above problems and to construct an apparatus of the type defined in the opening paragraph which precludes such permanent deformations in at least one of the drive elements which are constantly pressed against one another in the "information-signal-controlled recording" mode. To this end the invention is characterized in that the motor control circuit comprises a pulse generation device which, after the motor has been switched off in the absence of the detection signal during the given time interval, and while the "information-signal-controlled recording" mode is still active and the detection signal subsequently fails to appear, generates short control signal pulses which recur at given time intervals and which briefly switch on the motor. Thus, the drive of the record carrier cannot be disturbed as a result of the aforesaid permanent deformations and a uniform and correct drive of the record carrier is maintained.

BRIEF DESCRIPTION OF THE DRAWINGS

An embodiment of the invention will now be described in more detail, by way of non--limitative example, with reference to the drawings wherein.

DESCRIPTION OF THE PREFERRED EMBODIMENTS

Figure 1:
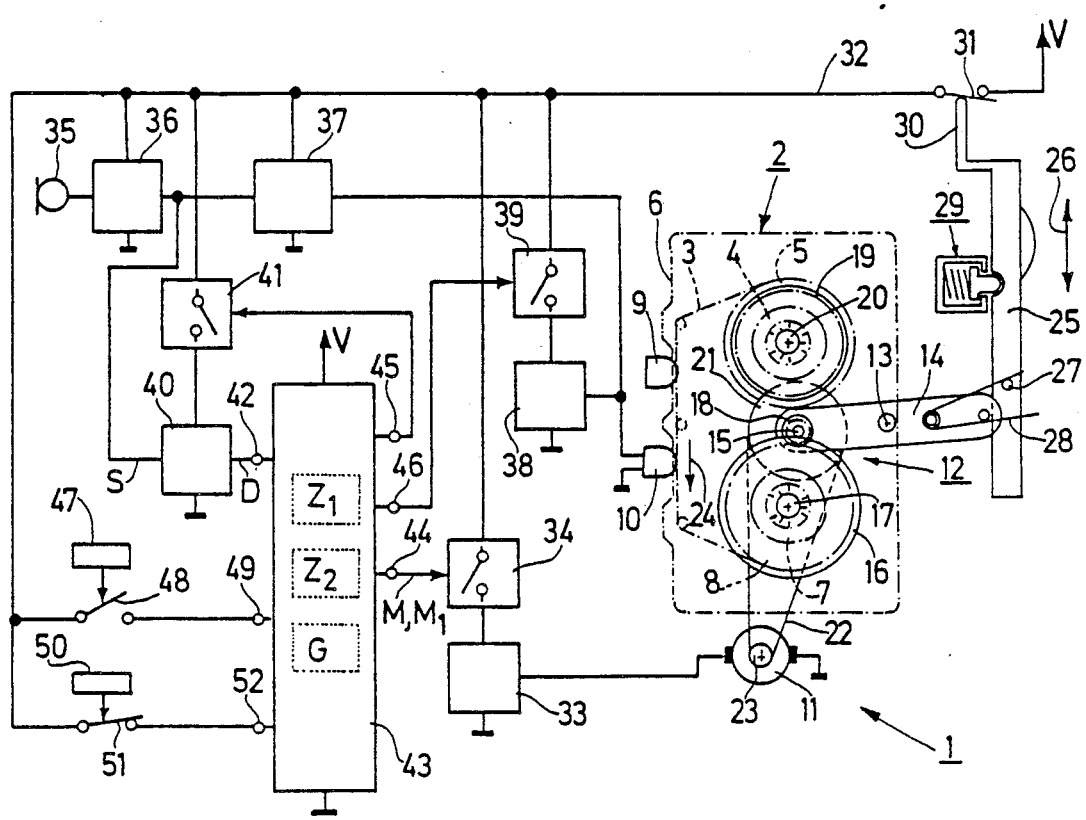
FIG. 1 shows diagrammatically an apparatus for recording speech signals on a record carrier in the form of a tape which is accommodated in a cassette and which during the recording of speech signals can be driven by a motor-driven drive arrangement comprising two drive elements which can be pressed against each other to cooperate non-positively.

FIG. 1 shows diagrammatically an apparatus 1 for recording dictated speech signals, which is constructed for example as a pocket dictation machine. The apparatus 1 accepts a cassette 2, which is shown diagrammatically in dash-dot lines in FIG. 1. The cassette 2 accommodates a magnetizable record carrier 3 in the form of a tape, hereinafter briefly referred to as the magnetic tape 3. In the cassette 2 the magnetic tape 3 extends from a tape reel 5 on a supply-reel hub 4 to a tape reel 8 on a take-up reel hub 7 along a narrow long front side 6 of the cassette. A magnetic erase head 9, which in principle comprises a permanent magnet, and a magnet head 10 can cooperate with the magnetic tape 3 via two openings, not shown, in the narrow side 6 for the purpose of recording and reproducing speech signals. The apparatus is also capable of reproducing speech signals, but the apparatus parts required for this purpose are not shown in FIG. 1 because they are not relevant here.

For driving the magnetic tape 3 the apparatus 1 comprises a motor 11 and a drive arrangement 12. The drive arrangement 12 comprises a lever-like support 14 which is pivotable about a spindle 13, a steel capstan 15 being rotatably supported on one end of said support and being arranged to cooperate non-positively with a friction wheel 16, which has a rubber coating at its circumference to provide suitable friction and which is rotationally locked to a take-up reel spindle 17 which is in driving engagement with the take-up reel hub 7 through the lower main wall of the cassette 2 to drive the take-up reel hub 7. A pinion 18 is rotationally locked to the capstan 15 to mesh with a gear wheel 19 which is rotationally locked to a supply spindle 20 which is in driving engagement with the supply reel hub 4 through the lower main wall of the cassette 2 to drive the supply reel hub 4. Moreover, a flywheel 21 is rotationally locked to the capstan 15 and is driven by a pulley 23 via a belt 22, which pulley is mounted on the motor shaft of the motor 11 and can thus be driven by the motor 11.

From a neutral centre position, not shown, in which neither the capstan 15 cooperates with the friction wheel 16 nor the pinion 18 cooperates with the gear wheel 19, the support 14 can be pivoted selectively in opposite directions into one of two operating positions. In one operating position, illustrated in FIG. 1, the capstan 15 is pressed against the friction wheel 16. This, operating position corresponds to the "normal forward" mode, in which the take-up reel hub 7 is driven to move the magnetic tape 3 past the magnetic head 10 in the direction indicated by the arrow 24, enabling speech signals to be recorded by means of the magnetic head 10. In the other operating position, which is not shown in FIG. 1, the pinion cooperates with the gear wheel 19. This operating position corresponds to the "rewind" mode, in which the supply reel hub 4 is driven to move the magnetic tape in a direction opposite to that indicated by the arrow 24 in order to rewind the magnetic tape 3 onto the supply reel hub 4, the magnetic head 10 remaining inoperative in this case and the erase head 9 being rendered inoperative in that it is moved away from the magnetic tape 3 in a manner not shown.

For moving the support 14 there is provided a movably guided mode-selection slide 25, which is movable selectively from an off-position not shown in FIG. 1, in which position the support 14 is in its neutral centre position, in opposite directions indicated by the double arrow 26 into one of two on-positions. A pin 27 projects from the slide 25 and is situated between the two legs of a leg spring 28 arranged on the support 14 in order to pivot the support 14 via one of the legs of the leg springs 28 when the slide 25 is moved, as is illustrated in FIG. 1 for one of the on-positions. In the on-position of the slide 25 as shown in FIG. 1, which corresponds to the "normal forward" mode, the slide 25 is retained by means of a latching device 29, shown diagrammatically. One end of the slide 25 has an L-shaped projection 30 by means of which a switch 31 is closed in the "normal forward" mode in order to apply a supply voltage V to a supply line 32 which can energize a number of circuit elements of the apparatus 1 with the supply voltage V, as will be described in more detail hereinafter. It is to be noted that when the slide 25 is in the on-position corresponding to the "rewind" mode, in which the support 14 is pivoted from its neutral centre position in the other direction than shown in FIG. 1, the slide 25 also actuates a switch to start the motor 11, but this is not illustrated in FIG. 1 because it is not relevant here.

To power the motor 11 the apparatus 1 comprises a motor supply circuit 33 which comprises a speed-control stage and which can be connected to the supply voltage line 32 via a switching stage 34 which can be driven into a conductive state by a control signal. When the switching stage 34 conducts and the supply voltage V is applied to the line 32 the motor supply circuit 33 is energized with the supply voltage V and is thus switched on, so that it energizes the motor 11 to drive the motor in such a way that its speed is controlled, causing the flywheel 21 and the apparatus parts which are in driving engagement therewith to be driven via the pulley 23 and the belt 22.

The apparatus 1 further comprises a microphone 35, whose output signals are applied to a preamplifier circuit 36. The preamplifier circuit 36 drives a recording-signal processing circuit 37, which applies the speech signals to be recorded to the magnetic head 10. During the recording of speech signals the magnetic head 10 also receives a bias signal generated by a bias-signal oscillator 38, which can be connected to the supply voltage line 32 via a further switching stage 39 which can be driven into conduction by means of a control signal. When the switching stage 39 conducts and the supply voltage V is applied to the line 32 the oscillator 38 is energized with the supply voltage V and is consequently turned on, so that the oscillator supplies a bias signal to the magnetic head The apparatus 1 further comprises a speech signal detector 40, which can be connected to the supply voltage line 32 via a further switching stage 41 which can be driven into conduction by means of a control signal. When the switching stage 41 conducts and the supply voltage V is applied to the line 32 the speech signal detector 40 is energized with the supply voltage V and is consequently turned on. The speech signal detector 40 is connected to the preamplifier circuit 36. When a speech signal S, as shown diagrammatically in FIG. 2a, appears the speech signal detector 40 supplies a detection signal D, as shown diagrammatically in FIG. 2b. The detection signal D is applied to an input 42 of a microprocessor 43, which in the present case is also employed inter alia as the motor control circuit for on/off control of the motor 11. In the apparatus 1 the microprocessor 43 is permanently connected to the supply voltage V. To start the motor 11 the microprocessor 43 produces a control signal, for example as shown in FIG. 2c, on its output 44. This control signal is applied to the switching stage 34, so that the switching stage 34 is driven into conduction when this control signal appears and the motor supply circuit 33 is connected to the supply voltage line 32 during the appearance of this control signal. A further control signal, not shown, for controlling the switching stage 41 is supplied by the microprocessor 43 via a further output 45 to switch on the speech signal detector 40 and a further control signal, not shown, for controlling the switching stage 39 is supplied by the microprocessor 43 via a further output 46 to switch on the oscillator 38.

To select a "normal recording" mode the apparatus 1 comprises a key 47 which is constructed, for example, as a locking key and upon actuation closes a switch 48. The switch 48 has one of its sides connected to the supply voltage line 32 and its other side to a further input 49 of the microprocessor 43. Thus, actuation of the key 47 is signalled to the microprocessor 43 by the closure of the switch 48. When actuation of the key 47 for selection of the "normal recording" mode is signalled to the microprocessor 43 the microprocessor produces such a control signal on each of its outputs 44 and 46 that the two switching stages 34 and 39 remain permanently conductive. In this case the microprocessor 43 does not produce a control signal on its output 45, so that the switching stage 41 remains in its non-conductive state. In this way the preparation for the "normal recording" mode is effected.

If the mode-selection slide 25 is now set from its off-position to its on-position shown in FIG. 1 the support 14 is pivoted, causing the capstan 15 to be pressed against the friction wheel 16, and subsequently the switch 31 is closed, causing the supply voltage V to be applied to the supply voltage line 32 and, consequently, the supply voltage V to be applied to the preamplifier circuit 36, to the recording-signal processing circuit 37, to the oscillator 38 via the switching stage 39, and to the motor supply circuit 33 via the switching stage 34, so that all the circuit elements necessary for the normal recording of speech signals are activated and a normal recording of speech signals is possible in the customary manner.

To select a "speech-signal-controlled recording" mode the apparatus comprises a further key 50, which is also constructed as, for example, a locking key and upon actuation it closes a further switch 51. The further switch 51 has one of its sides connected to the supply voltage line 32 and its other side to a further input 52 of the microprocessor 43. Thus, actuation of the further key 50 is signalled to the microprocessor 43 by the closure of the further switch 51. When actuation of the further key 50 for selection of the "speech-signal-controlled recording" mode is signalled to the microprocessor 43 the microprocessor produces such a control signal on each of its outputs 45 and 46 that the two switching stages 41 and 39 remain permanently conductive. In this case, as a result of the actuation of the further key 50, the microprocessor 43 does not produce a control signal on its output 44 for the time being, so that initially the switching stage 34 remains in its non-conductive state. If the mode-selection slide 25 is now set from its off-position to its on-position shown in FIG. 1 the support 14 is pivoted, causing the capstan 15 to be pressed against the friction wheel 16, and subsequently the switch 31 is closed, causing the supply voltage V to be applied to the supply voltage line 32 and, consequently, the supply voltage V to be applied to the preamplifier circuit 36, to the recording-signal processing circuit 37, to the oscillator 38 via the switching stage 39, and to the speech signal detector 40 via the switching stage 41 and hence to be switched on. However, since for the time being the switching stage 34 is still cut off, the motor supply circuit 33 is not yet energized with the supply voltage V and thus remains off, so that the motor 11 is not driven but remains stationary. In this way the preparation for the "speech-signal-controlled recording" mode is effected.

Figure 2:
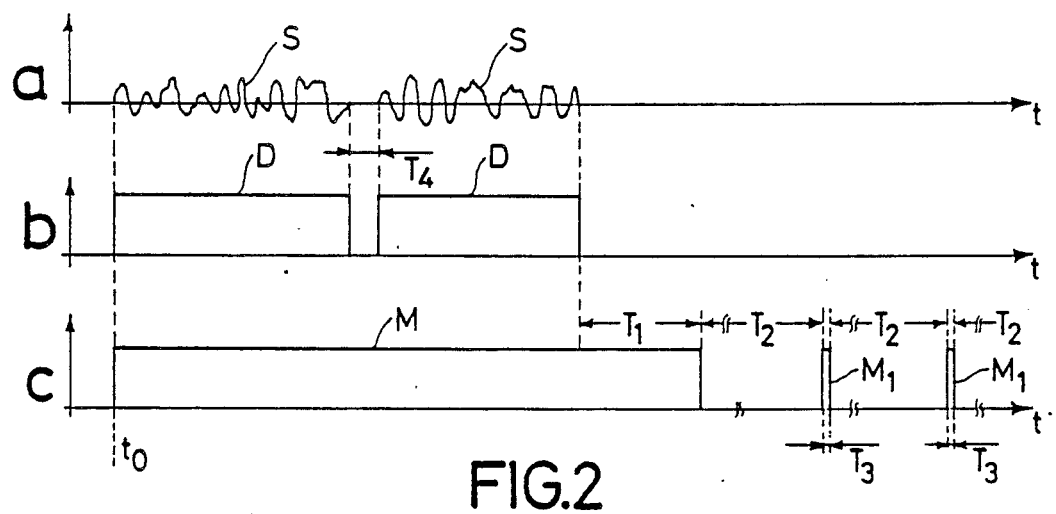
FIG. 2 shows waveform diagrams of signals appearing in the apparatus shown in FIG. 1.

If a user of the apparatus 1 now begins to speak into the microphone 35, speech signals S, as shown diagrammatically in FIG. 2a, appear on the output of the preamplifier circuit 36 and, together with the bias signal generated by the oscillator 38, these speech signals are applied to the magnetic head 10 via the recording-signal processing circuit 37, which may comprise a signal delay stage to delay the speech signals to be recorded, in order to preclude syllable loss when the recording of speech signals begins in the "speech-signal-controlled recording" mode. The speech signals supplied by the preamplifier circuit 36 are also applied to the speech signal detector 40, which when a speech signal S appears produces a detection signal D, as shown in FIG. 2b. The detection signal D is applied to an input 42 of the microprocessor 43, which also functions as motor control circuit. In response thereto the microprocessor 43 produces a control signal M to switch on the motor 11, as is illustrated in FIG. 2c. This control signal M, which appears on the output 44 of the microprocessor 43, is applied to the switching stage 34, which when the control signal M appears is driven into conduction, so that the supply voltage V is also applied to the motor supply circuit 33 and this circuit is switched on, causing the motor 11 and hence the capstan 15 and the friction wheel 16 and, consequently, the magnetic tape 3 to be driven, the magnetic tape 3 being wound onto the take-up reel hub 7. The speech signals S applied to the magnetic head 10 are then recorded on the magnetic tape 3. As can be seen in FIG. 2, the control signal M, which is generated by the microprocessor 43 when the apparatus 1 is set to the "speech-signal-controlled recording" mode, immediately starts the motor 11 when the detection signal D appears and if the detection signal D fails to appear for a given time interval $T_1$, which is of the same order of magnitude as normal breaks in speech signals as caused by normal speech pauses in dictations, it keeps the motor energized and does not turn off the motor 11 until the given time interval $T_1$ has elapsed. In practice the time interval $T_1$ may be selected to be, for example, approximately two seconds.

As will be apparent from the foregoing, the capstan 15 and the friction wheel 17 are constantly pressed against each other when the apparatus 1 is in the "speech-signal-controlled recording" mode. This is also the case if in the "speech-signal-controlled recording" mode the user of the apparatus 1 interrupts a dictation process for a longer time or even forgets to switch off the "speech-signal-controlled recording" mode after a dictation. In order to prevent the steel capstan 16 from being pressed into the rubber coating of the friction wheel 16, which would result in a permanent deformation of the rubber coating of the friction wheel 16 and thus in a uniform drive of the friction wheel 16 and, consequently, the magnetic tape 3, the steps described hereinafter have been taken in the present apparatus 1.

The microprocessor 43, which is employed inter alia as motor control circuit, comprises a pulse generation device G, which is shown diagrammatically in dotted lines and which upon switching off of the motor 11 after the detection signal D has failed to appear for the given time interval $T_1$ while the "speech-signal-controlled recording" mode subsequently remains operative and the detection signal D subsequently fails to appear at given time intervals $T_2$ repetitively generates short control signal pulses of a given duration $T_3$, which are referenced $M_1$ in FIG. 2c and which briefly start the motor 11 for the given time interval $T_3$. In practice, the time intervals $T_2$ may be selected to be, for example, approximately 100 ms. In the present apparatus 1 the control signal pulses $M_1$ always have the same pulse duration $T_3$. However, alternatively it is possible to make the pulse duration of the control signal pulses $M_1$ variable over a given time range, for example under control of a random generator.

Figure 3:
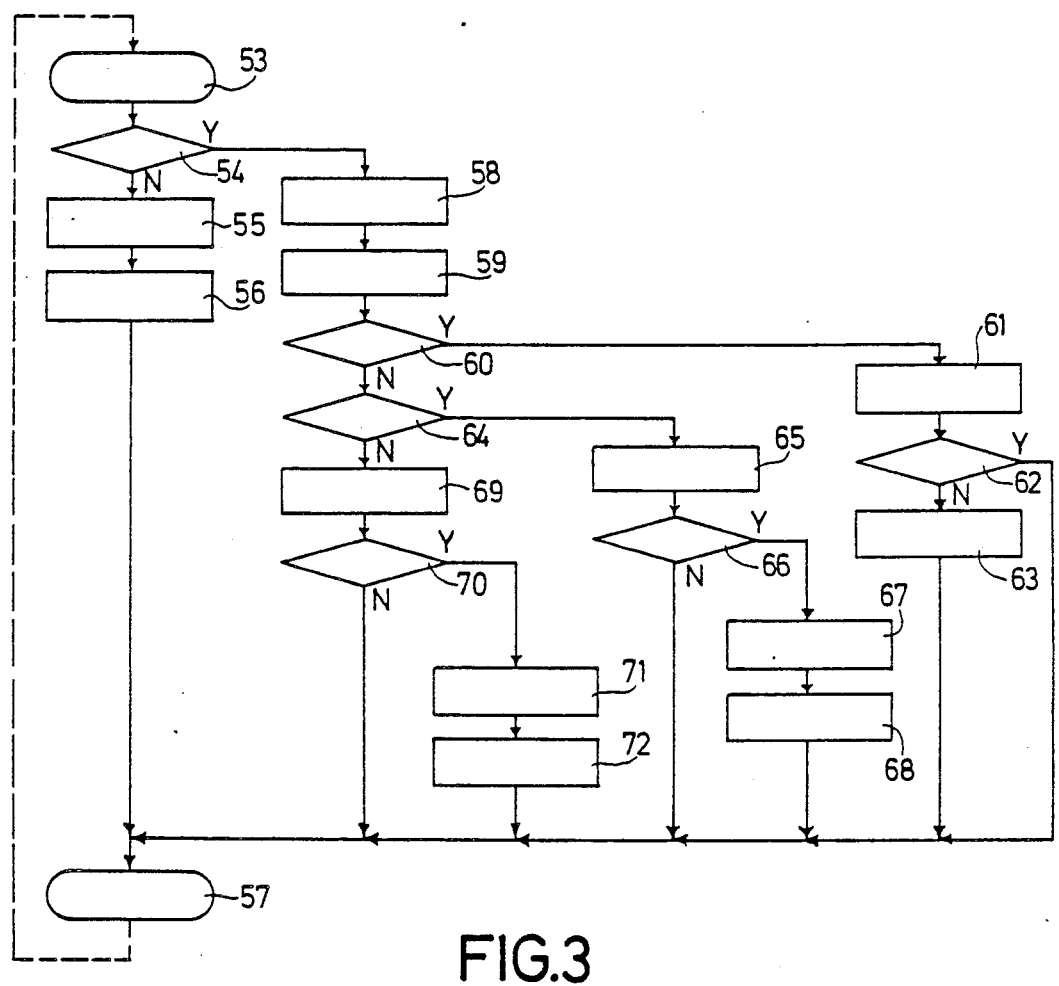
FIG. 3 is a flow chart of a program performed by a microprocessor in the apparatus shown in FIG. 1 to start the motor of such apparatus in a "speech-signal-controlled-recording" mode.

A program cycle performed by the microprocessor 43 of the apparatus in FIG. 1 to generate the control signal, shown in FIG. 2c, for starting the motor 11 will now be described with reference to the flow chart shown in FIG. 3. The program cycle forms part of a main program loop which is carried out in the microprocessor 43 and which is represented symbolically by the broken line interconnecting the end block and the starting block of the present flow chart in FIG. 3.

The program cycle is started in block 53. In the next block 54 it is ascertained whether the supply voltage V is available on the input 52 of the microprocessor 43, i.e. whether the switch 51 has been closed and hence the "speech-signal-controlled recording" mode has been started upon actuation of the key 50. If this is not the case an internal time counter $Z_1$ in the microprocessor is set to zero in block 55, which counter is diagrammatically shown in dotted lines in FIG. 1. Subsequently, a further internal time counter $Z_2$ in the microprocessor is set to zero, which counter is shown diagrammatically in dotted lines in FIG. 1. This program cycle is then terminated in block 57 and the main program loop is continued, in the course of which the block 53 is reached again in which the present program cycle is started.

When the user of the apparatus 1 actuates the key 50 to start the "speech-signal-controlled recording" mode, this is checked in block 54, the check in block 54 yielding a positive result. In block 58 the output 45 of the microprocessor 43 is then set to a given high potential H, causing the switching stage 41 for switching on the speech signal detector 40 to be driven into conduction and the speech signal detector 40 to be switched on. Subsequently, the output 46 of the microprocessor 43 is set to the given high potential H in block 59, so that the switching stage 39 for starting the bias oscillator 38 to be driven into conduction and the oscillator 38 to be started. In block 60 it is now ascertained whether a detection signal D, generated by the speech signal detector 40, appears on the input 42 of the microprocessor 43. For simplicity it is assumed that immediately after selection of the "speech-signal-controlled recording" mode the user begins to speak and the speech signal detector 40 consequently detects a speech signal S and therefore supplies a detection signal D to the input 42 of the microprocessor, which instant is referenced to $t_0$ in FIG. 2. The check in block 60 now has a positive result, so that the program proceeds with block 61. In block 61 the time counter $Z_1$ is set to zero. Now it is ascertained whether the motor 11 of the apparatus 1 has been switched on, which is effected by checking in block 62 whether the output 44 of the microprocessor 43 has been set to the given high potential by which the switching stage 34 for switching on the motor supply circuit 33 is driven into conduction. As the motor 11 has not yet been started after selection of the "speech-signal-controlled recording" mode, the check in block 62 yields a negative result. Consequently, the motor 11 is now started in that in block 63 the output 44 of the microprocessor 43 is set to the given high potential H, causing the switching stage 34 for switching on the motor supply circuit 33 to be driven into conduction so that the motor 11 is started. Now the program cycle is terminated in block 57. As long as a detection signal D remains present on the input 42 of the microprocessor 43, the blocks 53, 54, 58, 59, 60, 61 and 62 are traversed again when this program cycle is subsequently repeated and after block 62, in which the check yields a positive result because the motor 11 is already energized, the program cycle is terminated in block 57.

During a normal speech pause, in which no speech signal appears for a time interval $T_4$ smaller than the two-seconds time interval $T_1$ and the speech signal detector 40 consequently does not supply a detection signal, as is shown in FIGS. 2a and 2b, the test in block 60 has a negative result when the program cycle is subsequently repeated. In this case the program proceeds with block 64. In block 64 it is checked whether the output 44 of the microprocessor 43 has been set to the given high potential H, i.e. whether the motor 11 has been started. Since the motor 11 has been started as a result of the previous presence of a speech signal S, the test in block 64 yield a positive result. Therefore, the time counter $Z_1$ is enabled in block 65 and is automatically incremented in conformity with the elapsed time independently of the subsequent program cycle. After this it is checked in block 66 whether the count of the time counter $Z_1$ has reached a value corresponding to the time interval $T_1$ of two seconds. If this is not the case the program cycle is terminated in block 57.

In the situation illustrated in FIGS. 2a and 2b a speech signal S occurs again after the time interval $T_4$, which is smaller than the time interval $T_1$ of two seconds, so that again a detection signal D appears on the input 42 of the microprocessor 43. Therefore the check in block 60 has a positive result when the present program cycle is subsequently repeated, so that the program cycle proceeds with blocks 61 and 62, the time counter $Z_1$, which has been enabled previously in block 65, being reset to zero. After block 62 the program cycle is now terminated in block 57.

If subsequently the dictation process is interrupted for a longer time, as is assumed in the situation illustrated in FIGS. 2a and 2b, but the "speech-signal-controlled recording" mode remains active, the absence of a detection signal D will be detected in block 60 when the program cycle is subsequently repeated. Therefore, the program cycle proceeds with block 64. As the motor 11 is still energized, which is ascertained in block 64 by detection of the high potential H on the output 44 of the microprocessor 43, the program cycle proceeds with blocks 65 and 66 and is terminated in block 57. This continues as long as the two-seconds time interval $T_1$ after default of the speech signal S and of the detection signal D has not yet elapsed. When after expiry of the time interval $T_1$ it is found in block 66 that the count of the time counter $Z_1$ enabled in block 65 has a value corresponding to the two-seconds time interval $T_1$, the program cycle is continued in block 67. In block 67 the output 44 of the microprocessor 43 is set to a given low potential L, as shown in FIG. 2c, as a result of which the switching stage 34 is cut of and consequently the motor supply circuit 33 and hence the motor 11 are switched off. In block 68 the further time counter $Z_2$ is then set to zero. After this the program cycle is terminated in block 57.

As the program cycle is subsequently repeated it is found in block 64 that the motor 11, which has been switched off in block 67, is now de-energized, so that the check in block 64 has a negative result. Therefore, the program cycle proceeds with block 69. In block 69 the further time counter $Z_2$ is enabled and regardless of the further program cycle this counter is incremented automatically in accordance with the elapsed time. In block 70 it is now ascertained whether the count of the further time counter $Z_2$ has reached a value corresponding to the time interval $T_2$ of thirty seconds. As long as this is not the case the program cycle is terminated in block 57. However, if in block 70 it is found that the count of the further time counter $Z_2$ has a value corresponding to the time interval $T_2$ of thirty seconds, the program cycle proceeds with block 71. In block 71 the internal pulse generation device G of the microprocessor is activated and sets the output 44 of the microprocessor 43 to the high potential H for a given time interval of 100 ms, so that the microprocessor 43 produces a control signal pulse $M_1$ as shown in FIG. 3c on its output 44. The control signal pulse $M_1$ is applied to the switching stage 34, causing the motor to be switched on for a time interval $T_3$ of 100 ms. After this the further time counter $Z_2$ is set to zero in block 72. Now the program cycle is terminated in block 57.

When the program cycle is subsequently repeated the time counter $Z_2$ is again enabled in block 69. The program cycle then proceeds with block 70 and is terminated in block 57. This is repeated until the time interval $T_2$ of thirty seconds has expired again, after which the count of the further time counter $Z_2$ has a value corresponding to the time interval $T_2$, which is detected in block 70. Consequently, the program cycle is continued in block 71, in which the pulse generation device G again generates a control signal pulse $M_1$. This successive recurrent generation of control signal pulses $M_1$ by means of the pulse generation device G in block 71 proceeds until the user again starts to speak or the "speech-signal-controlled recording" mode is switched off.

When the user begins to speak again the program cycle first proceeds with blocks 53, 54, 58, 59, 60, 61, 62, 63 and 57 and then with blocks 53, 54, 58, 59, 60, 61, 62 and 57. If subsequently another long speech pause occurs the program cycle first traverses the blocks 53, 54, 58, 59, 60, 64, 65, 66 and 57 and then the blocks 53, 54, 58, 59, 60, 64, 65, 66, 67, 68 and 57, the time counter $Z_2$ now being reset to zero in block 68, after this counter has been enabled in block 69 before the user has begun to speak again. Subsequently, the program cycle proceeds with blocks 53, 54, 58, 59, 60, 64, 69, 70 and 57 and then with blocks 53, 54, 58, 59, 60, 64, 69, 70, 71, 72 and 57, the pulse generation device G again generating the short control signal pulses $M_1$. When the user switches off the "speech-signal-controlled recording" mode the program cycle proceeds via the blocks 53, 54, 55, 56 and 57.

As will be apparent from the foregoing, the motor 11 of the apparatus 1 is repeatedly started for a short time, for example 100 ms, in the case that the apparatus is set in the "speech-signal-controlled recording" mode, the capstan 15 being constantly pressed against the rubber coating of the friction wheel 16, and a dictation process is interrupted for a longer time or the user has forgotten to switch off the "speech-signal-controlled recording" mode. As a result of this brief starting of the motor 11 the capstan 15, which is driven by the motor 11, is rotated through, for example, about half a turn on account of the reduction ratio between the motor 11 and the capstan 15, so that the friction wheel 16 is only rotated through a very small angle. This small rotation of the friction wheel 16 only advances the magnetic tape 3 over a very small distance upon every control signal pulse $M_1$, so that even if this pulsewise intermittent drive of the magnetic tape proceeds for several hours only a very small length of tape is moved past the magnetic head 10. On account of this very small rotations of the capstan 15 and the friction wheel 16 driven by this capstan, these two drive elements are each time brought in different positions relative to one another, so that they are not pressed against each other in the same relative position for a longer time. This very simply precludes a permanent deformation of the friction wheel 16, i.e. of its circumferential rubber coating. Thus, in the present apparatus the transport of the magnetic tape cannot be disturbed by such permanent deformations, so that always a uniform and correct drive of the magnetic tape is guaranteed.

The invention is not limited to the exemplary embodiment described above but ca also be utilized advantageously in other apparatuses. The motor control circuit need not be constructed by means of a microprocessor, but may also comprise discrete parts, in which case the pulse generation device is also constructed by means of discrete parts. In the exemplary embodiment described herein the drive arrangement comprises a capstan which is pressed against a friction wheel which is rotationally locked to a reel spindle to drive the magnetic tape. This friction wheel may also be driven via a multi-stage friction-wheel drive, in which case it is equally advantageous to bring the friction wheels of the multi-stage friction drive repeatedly in different positions relative to each other in order to preclude permanent deformations of the friction wheels. The invention can also be used advantageously in an apparatus in which the magnetic tape is driven directly by a capstan which cooperates with this tape and against which the magnetic tape is pressed by means of, for example, a rubber pressure roller, in order to bring the capstan and the pressure rollers in different positions relative to each other during long recording pauses. The invention can also be used advantageously in apparatuses for recording music signals and in apparatuses for recording digital data signals, in which case the occurrence of music signals or digital data signals is monitored and detected in the "information-signal-controlled recording" mode. The record carrier need not have the form of a tape but may also be disc-shaped or take the form of a sheet.

What is claimed is:

1. Apparatus for recording information signals on a record carrier, which apparatus can be set to an information-signal-controlled recording mode and, for driving the record carrier, comprises a motor and a drive arrangement adapted to be driven by the motor; said drive arrangement comprising at least two drive elements which are constantly pressed against each other during said recording mode; said apparatus further comprising:
   an information signal detector which, during the appearance of an information signal, supplies a detection signal; and
   a motor control circuit which in response to said detection signal generates a control signal for switching on said motor, which control signal during said recording mode immediately switches on the motor upon the appearance of the detection signal, keeps the motor switched on when the detection signal fails to appear during a given time interval of the order of magnitude of normal breaks in the information signal, and does not switch off the motor until the given time interval has elapsed;
   characterized in that the motor control circuit comprises a pulse generation device which, after the motor has been switched off in the absence of the detection signal during the given time interval, while the recording mode is still active and the detection signal subsequently fails to appear, generates short control signal pulse which recur at given time intervals and which briefly switch on the motor.

2. In a recording apparatus, the combination comprising:
   means for translating a record carrier on which information signals are recorded in use, said means for translating including a pair of relatively movable drive elements in contact for frictionally transmitting motion between them during translation of the record carrier;
   a motor for driving said means for translating;
   an information signal detector for detecting an information signal to be recorded and for developing a detection signal in response to the information signal;
   a motor control circuit operative in a mode responsive to the detection signal for generating a continuous motor control signal in response to the detection signal to drive a record carrier during the occurrence of an information signal to be recorded and for continuing generating the motor control signal for a predetermined period of time after the termination of the detection signal; and
   said motor control circuit comprising means for generating an intermittent motor control signal after the termination of the continuous motor control signal to intermittently operate said motor and intermittently relatively displace said drive elements while said motor control circuit is in the mode responsive to the detection signal and in the absence of the detection signal.

3. In a recording apparatus according to claim 2;
one of said drive elements is incompressible and the other of said drive elements is resilient;
said pair of drive elements are in compressive contact sufficient to deform the resilient one of said drive elements; and
said means for generating an intermittent motor control signal is effective to generate pulses to operate said motor and relatively move said drive elements to successively change the portion of said resilient drive element which is deformed by said incompressible drive element.

4. In a record apparatus according to claim 3;
said resilient drive element is a wheel having a resilient outer surface.

* * * * *